3,388,063
MAGNESIUM OVERBASED PHENATE
Nylen L. Allphin, Jr., Pinole, Calif., assignor to Chevron Research Company, San Francisco, Calif., a corporation of Delaware
No Drawing. Filed Aug. 10, 1966, Ser. No. 571,433
7 Claims. (Cl. 252—33.4)

ABSTRACT OF THE DISCLOSURE

Highly overbased magnesium phenate compositions are prepared by combining magnesium oxide with a mono- and dihydric alcohol at an elevated temperature in the presence of a sulfonate, removing at least part of the dihydric alcohol, followed by the addition of a sulfurized alkylphenol and carbon dioxide.

---

This invention concerns novel overbased alkaline earth metal alkylphenates having relatively high alkalinity values. More particularly, this invention concerns highly overbased magnesium alkylphenates.

Overbased alkylphenates find wide use as detergents and acid neutralizing agents in lubricating oils, particularly for use in diesel engines. By overbased phenate is intended that the number of equivalents of metal which is present is greater than the number of equivalents of phenolic hydroxyl. For the most part, the magnesium, other than that combined with the phenol, is present in the hydrocarbon composition as a complex or carbonate.

While numerous references teach the possibility of forming overbased magnesium phenates, for the most part, their efforts are illustrated by calcium or barium. Magnesium has been found to be relatively intractable for preparing highly overbased phenates. Yet, because of its low atomic weight, less ash is produced with magnesium, than a composition of equal alkalinity reserve using calcium or barium.

It has now been found that highly overbased magnesium alkylphenates can be prepared by combining magnesium oxide, a dihydric alcohol, a relatively high molecular weight monohydric alcohol and a small amount of an alkaline earth metal sulfonate in a hydrocarbon medium, heating the mixture so as to drive off water and a major portion of the dihydric alcohol, adding a sulfurized alkylphenol at an elevated temperature followed by carbonation of the composition to form magnesium carbonate and finally removing the volatile materials.

Before considering the process for preparing the compositions of this invention, the individual reactants will be considered first. The alkylphenols which find use in this invention will for the most part have the following formula:

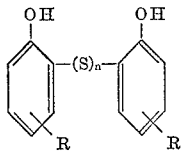

wherein $n$ is an integer in the range of 1 to 3, most usually 2, the weight percent of sulfur generally being in the range of about 5 to 15, preferably 8 to 12, and R is an alkyl group of from 9 to 30 carbon atoms, averaging from about 10 to 15 carbon atoms. R may be straight chain or branched chain or a mixture thereof, though R will most usually be branched, e.g., polypropenyl, usually branches of not more than one carbon atom, i.e., methyl. Usually, the R groups will be substituted meta or para to the hydroxyl, but some of the R groups may be present in the ortho position as well.

Illustrative alkyl groups include decyl, tridecyl, octadecyl, pentapropenyl, tetrapropenyl, eicosyl, triacontyl, etc.

The sulfurized alkylphenol may be prepared in a variety of ways, various procedures being reported in the literature. Most conveniently, the alkylphenol may be reacted with sulfur monochloride. See, for example, U.S. Patent No. 2,409,687.

The basic sulfonates which are employed contain from 0 to 300%, usually 0 to 100%, of metal in excess of the metal of normal sulfonates—essentially neutral metal sulfonates. See U.S. Patent No. 3,178,368. By neutral metal sulfonates are intended sulfonates wherein the sulfonic acid moiety and the metal moiety are present in equivalent amounts. The nature of metal sulfonates permits an excess of metal cation to be dispersed in an essentially hydrocarbon medium, the excess metal cation probably being complexed.

The basic sulfonates used herein are derived from neutral sulfonates represented by the formula:

$$[(R^1)_a A SO_3]_2 M^1$$

wherein $R^1$ is a high molecular weight straight chain, branched chain or cyclic, saturated or unsaturated, essentially hydrocarbon radical, usually aliphatic, having a molecular weight of about 150 to about 800; A is an aromatic hydrocarbon radical, such as benzene, naphthalene, anthracene, etc., usually of from 6 to 12 carbon atoms; $a$ is a number having the value of 1 to 4, usually 1 to 2; and $M^1$ is an alkaline earth metal of atomic number 12 to 56, usually magnesium or calcium.

Examples of suitable hydrocarbon substituents on the aromatic ring of the sulfonate are the following: dodecane, hexadecane, eicosane, triacontane radicals; radicals derived from petroleum hydrocarbons, such as white oil, wax, etc.; radicals derived from olefin polymers, such as polypropylene or polybutylene, etc. The sulfonic acids used in preparing the basic sulfonates of this invention also include the oil soluble sulfonic acids obtained from petroleum, such as the mahogany acids, and the synthetic sulfonic acids prepared by various methods of synthesis.

The metal sulfonates are exemplified as follows: calcium or magnesium white oil benzene sulfonate, calcium or magnesium mahogany petroleum sulfonate, calcium or magnesium triacontyl benzene sulfonate, etc. Usually, the metal cation will be calcium.

The high molecular weight alcohol, which is used in amounts of not more than 75 weight percent of the sulfurized alkylphenol charge, preferably 10 to 50 weight percent, are those monohydric alcohols containing from about 8 to 18 carbon atoms, preferably 9 to 15 carbon atoms. These alcohols are exemplified as follows: octyl alcohol, decyl alcohol, dodecyl alcohol, tridecyl alcohol, tetradecyl alcohol, hexadecyl alcohol, etc.

A polyhydric alcohol of from 2 to 3 carbon atoms, usually the dihydric alcohols ethylene or propylene glycol, are used. A sufficient amount of the glycol is employed to bring the reactants into efficient contact for substantial reaction in a reasonably short time; that is, the amount of alcohol used is sufficient to dissolve at least portions of the reactants and thus provide substantial contact between them. For this purpose it is beneficial to use certain ratios by weight of the magnesium oxide to glycol. The magnesium oxide:glycol weight ratio may vary from 3 to 1 to about 1 to 3, preferably from about 0.5 to 2 to 2 to 1.

The amount of magnesium oxide which is used will generally be from about 3 to 5 equivalents per equivalent of phenolic hydroxyl, more usually from about 3.5 to 4.5 equivalents per equivalent of phenolic hydroxyl. Generally, at least about 80 weight percent of the magnesium is incorporated into the product, and most usually, higher amounts are incorporated, so that an excess of about 5 to 20 weight percent of the magnesium over that to be incorporated in the final product will be employed.

For each mole of alkylphenol, generally not more than 0.5 equivalent of sulfonate will be used and most usually from about 0.01 to 0.05 equivalent of sulfonate will be used. By alkylphenol is intended the molecule prior to sulfurization.

Generally, when preparing the phenates, a lubricating oil will be used as a reaction medium. Thus, by such use of a lubricating oil, oil concentrates of the desired highly basic carbonated sulfurized magnesium phenate can be obtained directly. Such lubricating oils include a wide variety of lubricating oils, such as petroleum derived oils: naphthenic base, paraffic base, asphaltic base and mixed base lubricating oils; other hydrocarbon lubricants, e.g., lubricating oils derived from coal products and the synthetic oils, e.g., alkylene polymers; as well as nonhydrocarbon lubricating oils such as the alkylene oxide type polymers; etc.

The amount of reaction medium, e.g., oil, will generally be from about 10 to 55 weight percent of the total composition, more usually from about 15 to 40 weight percent of the total composition during the reaction, and from about 35 to 45 weight percent of the final composition after removal of the glycol and high molecular weight alcohol.

Also included in the final composition is from about 0.0005 to 0.01 weight percent of the total composition of an antifoaming or defoaming agent; usually from about 0.001 to 0.005 weight percent. Numerous defoaming agents may be used such as silicones, silicates, fluorinated organic polymers, etc.

In preparing the overbased magnesium alkylphenates, the hydrocarbon medium, the monohydric alcohol, the dihydric alcohol, the sulfonate and magnesium oxide are combined and heated to a temperature at which the water and dihydric alcohol distill, generally at least about 300° F., usually from about 325° to 450° F., while taking water and at least 50%, but not more than 85%, of the glycol initially introduced overhead. Usually, from about 55 to 75 weight percent of the glycol will be taken overhead.

To the resulting mixture, while maintaining the temperature, the sulfurized alkylphenol is then added either neat or dispersed in a hydrocarbon medium. The amount of solvent will depend on the amount initially added to the reaction mixture. The sulfurized phenol will generally be from 25 to 100 weight percent of the solution.

The reaction mixture is then heated for at least about 30 minutes and usually from about 1 hour to 4 hours at a temperature below the boiling point of the monohydric alcohol, usually in the range of about 325° F. to 450° F., until almost complete reaction of the magnesium oxide and phenol is obtained. Carbon dioxide is then introduced into the mixture at temperatures in the range of about 275° F. to 350° F. while taken any volatile materials overhead, particularly any water which is formed.

After the desired amount of carbon dioxide has been added, that is, from 0.5 mole of $CO_2$ per gram atom of magnesium to the theoretical amount of $CO_2$—subtracting that amount of magnesium oxide which reacts with the phenol from the total amount of magnesium oxide added—the volatile materials are removed in vacuo. The temperature during the distillation is usually from about 350° to 500° F., while the pressure is reduced to a pressure in the range of about 10 to 150 mm. Hg. Also, from about 30 to 100% of the monohydric alcohol may be taken overhead. The product is then usually filtered, conveniently through a diatomaceous earth, e.g., celite.

The following example is offered by way of illustration and not by way of limitation.

Into a reaction vessel was introduced 100 g. of a Mid-Continent 100 neutral oil, 54 g. of tridecyl alcohol, 50 g. of ethylene glycol, 18 g. of basic calcium sulfonate (derived from 480 neutral oil containing 40% calcium in excess of that amount for a neutral sulfonate) and 45 g. of magnesium oxide and the mixture heated to 350° F. while taking glycol and water overhead. After about 2 hours, about 70 weight percent of the glycol initially introduced had been distilled.

To the resulting mixture was then added 250 g. of a 75 weight percent solution in neutral oil of 2,2-bis(tetrapropenylphenol)disulfide and the temperature maintained with stirring for about 2.4 hours. The temperature was then allowed to drop to from about 320° to 330° F. and 25 g. of carbon dioxide introduced over a 3 hour period. The temperature was then allowed to drop further to 300° F. and the pressure reduced slowly, while raising the temperature to a final temperature of 400° F. and lowering the pressure to a final pressure of about 40 mm. Hg. The product had a sediment of 1.15%. Analysis of the product showed 5.5% magnesium, 2.6% sulfur and 4.4% $CO_2$. The alkalinity value equals 252 mg. KOH/g.

The product was found to filter readily.

It is evident from the above example that the present process and composition are useful in providing an aikalinity reserve in lubricating oils. Moreover, by virtue of the much lower atomic weight of magnesium as compared to calcium, much less ash is created for an equal alkalinity value as compared to calcium or barium.

As will be evident to those skilled in the art, various modifications on this invention can be made or followed, in the light of the foregoing disclosure and discussion, without departing from the spirit or scope of the disclosure or from the scope of the following claims.

I claim:
1. A method for preparing over-based magnesium alkylphenates which comprises:
 (A) combining in an inert hydrocarbon liquid medium
  (1) a monohydric alcohol of from 8 to 18 carbon atoms; (2) a dihydric alcohol of from 2 to 3 carbon atoms; (3) magnesium oxide; and (4) a metal sulfonate of the formula:

wherein $R^1$ is an aliphatic hydrocarbon radical of from about 150 to 800 molecular weight, A is an aromatic hydrocarbon radical, $a$ is an integer of from 1 to 4 and $M^1$ is an alkaline earth metal of atomic number from 12 to 56,
 (B) heating to a temperature at which the water and dihydric alcohol distill, forming magnesium alkoxide,
 (C) adding sulfurized alkylphenol of the formula:

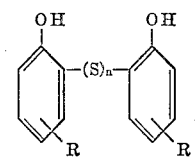

wherein $n$ is an integer of from 1 to 3, and R is an alkyl group of from 9 to 30 carbon atoms, the average number of carbon atoms being from 10 to 15 and heating at or below the distillation temperature of the monohydric alcohol for a time sufficient to react substantially all of the magnesium alkoxide to form the phenoxide,
 (D) introducing into the reaction mixture at a temperature of at least 275° F. carbon dioxide until at least 0.5 mole of $CO_2$ per gram atom of magnesium charged has been added,
 (E) distilling volatile materials overhead so that at least 30% of the monohydric alcohol is removed, wherein the ratios of materials added are from 0.01 to 0.05 equivalent of sulfonate per equivalent of phenolic hydroxyl, from 3 to 5 equivalents of magnesium oxide per equivalent of phenolic hydroxyl, from 3 to 1 parts of magnesium oxide to from 1 to 3 parts of dihydric alcohol, and monohydric alcohol in from 10 to 75 weight percent of the sulfurized alkylphenol.

2. A method according to claim 1, wherein $a$ is from 1 to 2, $n$ is about 2, from 0.01 to 0.05 equivalent of sulfonate per equivalent of phenolic hydroxyl is added, from 3.5 to 4.5 equivalents of magnesium oxide per equivalent of phenolic hydroxyl is added and one part of dihydric alcohol per from 0.5 to 2 parts of magnesium oxide is added.

3. A method according to claim 2, wherein R is polypropenyl, the dihydric alcohol is ethylene glycol and the monohydric alcohol is from 9 to 15 carbon atoms.

4. A method according to claim 1, wherein R is a mixture of branched chain and straight chain aliphatic groups.

5. A method according to claim 1, wherein at least about 0.9 mole of carbon dioxide per gram atom of magnesium charged is added.

6. A method according to claim 1, wherein from 0.0005 to 0.01 weight percent of the total composition of an antifoaming agent is added.

7. A composition prepared as described in claim 1, having from 35 to 45 weight percent of the composition of a hydrocarbon media.

References Cited
UNITED STATES PATENTS

| | | | |
|---|---|---|---|
| 2,916,454 | 12/1959 | Bradley et al. | 252—42.7 |
| 3,178,368 | 4/1965 | Hanneman | 252—42.7 XR |

DANIEL E. WYMAN, *Primary Examiner.*

PATRICK P. GARVIN, *Examiner.*